(12) United States Patent
Kim et al.

(10) Patent No.: US 9,730,054 B2
(45) Date of Patent: Aug. 8, 2017

(54) METHOD AND APPARATUS FOR EFFICIENTLY CONTROLLING INTER-CELL INTERFERENCE POWER IN A WIRELESS COMMUNICATION SYSTEM

(75) Inventors: Soeng Hun Kim, Yongin-si (KR); Sang Bum Kim, Seoul (KR); Gert Jan Van Lieshout, Middlesex (GB); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 13/979,066

(22) PCT Filed: Jan. 18, 2012

(86) PCT No.: PCT/KR2012/000423
§ 371 (c)(1),
(2), (4) Date: Jul. 10, 2013

(87) PCT Pub. No.: WO2012/099389
PCT Pub. Date: Jul. 26, 2012

(65) Prior Publication Data
US 2013/0286883 A1    Oct. 31, 2013

Related U.S. Application Data

(60) Provisional application No. 61/433,651, filed on Jan. 18, 2011.

(51) Int. Cl.
H04W 8/24    (2009.01)
H04W 84/04    (2009.01)
(Continued)

(52) U.S. Cl.
CPC .............. H04W 8/24 (2013.01); H04W 24/10 (2013.01); H04W 28/048 (2013.01);
(Continued)

(58) Field of Classification Search
None
See application file for complete search history.

(56) References Cited

U.S. PATENT DOCUMENTS 8,582,487 B2 * 11/2013 Gou et al. ............. 370/312
2008/0233967 A1    9/2008 Montojo et al.
(Continued)

FOREIGN PATENT DOCUMENTS

CN    101641918 A    2/2010
CN    WO-2010111925    * 10/2010    ............ 370/312
(Continued)

OTHER PUBLICATIONS

3GPP TSG RAN WG1 Meeting #63 R1-106143; Jacksonville, US, Nov. 15-19, 2010.*

(Continued)

*Primary Examiner* — Jeffrey M Rutkowski
*Assistant Examiner* — Ning Li
(74) *Attorney, Agent, or Firm* — Jefferson IP Law, LLP (57) ABSTRACT

The present invention relates to a method and apparatus for efficiently controlling inter-cell interference power in a wireless communication system. According to the present invention, a measurement method to be performed by a terminal in a wireless communication system comprises the following steps: receiving, from a base station, an RRC connection reestablishment message containing pattern information for measuring a serving cell or an adjacent cell; measuring, for an object to be measured indicated by said RRC reestablishment message, the serving cell or adjacent cell using the pattern information; and reporting the result of the measurement to the base station.

14 Claims, 11 Drawing Sheets

(51) Int. Cl.
| | |
|---|---|
| *H04W 28/04* | (2009.01) |
| *H04W 72/04* | (2009.01) |
| *H04W 72/08* | (2009.01) |
| *H04W 88/06* | (2009.01) |
| *H04W 24/10* | (2009.01) |

(52) U.S. Cl.
CPC ..... *H04W 72/0453* (2013.01); *H04W 72/085* (2013.01); *H04W 84/045* (2013.01); *H04W 88/06* (2013.01); *Y02B 60/50* (2013.01)

(56) References Cited

U.S. PATENT DOCUMENTS

| | | | |
|---|---|---|---|
| 2010/0240358 A1 | 9/2010 | Jen et al. | |
| 2011/0007856 A1* | 1/2011 | Jang et al. | 375/356 |
| 2011/0013554 A1* | 1/2011 | Koskinen | H04L 5/0094 370/315 |
| 2011/0275394 A1* | 11/2011 | Song | H04W 72/082 455/509 |
| 2011/0317657 A1* | 12/2011 | Chmiel et al. | 370/331 |
| 2012/0093012 A1* | 4/2012 | Pedersen | H04B 7/0626 370/252 |
| 2012/0115469 A1* | 5/2012 | Chen et al. | 455/434 |
| 2012/0157082 A1* | 6/2012 | Pedersen et al. | 455/422.1 |
| 2012/0275322 A1* | 11/2012 | Ji | H04L 1/0027 370/252 |
| 2013/0223409 A1 | 8/2013 | Jung et al. | |
| 2013/0225188 A1* | 8/2013 | Seo et al. | 455/450 |
| 2013/0229971 A1* | 9/2013 | Siomina et al. | 370/312 |

FOREIGN PATENT DOCUMENTS

| | | |
|---|---|---|
| JP | 2010-226716 A | 10/2010 |
| WO | 2012/061030 A1 | 5/2012 |
| WO | 2015/060655 A2 | 5/2012 |

OTHER PUBLICATIONS

Alcatel-Lucent Shanghai Bell et al., Specification Considerations on Restricted CSI Measurement, 3GPP TSG-RAN WG1 Meeting #63, R1-106000, Nov. 15-19, 2010.
LG Electronics, Details of eICIC in Macro-Pico case, 3GPP TSG-RAN WG1 Meeting #63, R1-106143, Nov. 15-19, 2010.
Texas Instruments, CSI Measurements on Restricted Subframes, 3GPP TSG-RAN WG1 Meeting #63, R1-105902, Nov. 15-19, 2010.
Mediatek Inc., Discussion of Restricted CSI Measurements in Macro-Pico, 3GPP TSG-RAN WG1 Meeting #63, R1-106008, Nov. 15-19, 2010.
Nokia Siemens Networks et al., TDM eICIC Patterns for Rel-10 UE measurement restrictions, 3GPP Draft, R4-104309, Nov. 9, 2010, XP050499494, Jacksonville, USA.
LG Electronics Inc, Measurement restriction for macro-pico scenario, 3GPP Draft, R2-106579, Nov. 9, 2010, XP050467226, Jacksonville, USA.
CMCC, Measurement resource restriction patterns for inter-frequency measurement in eICIC, 3GPP Draft, R2-110394, Jan. 11, 2011, Dublin, Ireland.

\* cited by examiner

METHOD AND APPARATUS FOR EFFICIENTLY CONTROLLING INTER-CELL INTERFERENCE POWER IN A WIRELESS COMMUNICATION SYSTEM

BACKGROUND OF THE INVENTION

Field of the Invention

The present invention relates to a wireless communication system and, in particular, to a method and apparatus for controlling inter-cell interference power amount efficiently.

Description of the Related Art

The mobile communication system has been developed for the user to communicate on the move. With the rapid advance of technologies, the mobile communication system has evolved to the level capable of providing high speed data communication service as well as voice telephony service.

Recently, as one of the next generation mobile communication system, Long Term Evolution (LTE) is on the standardization by the $3^{rd}$ Generation Partnership Project (3GPP). LTE is a technology designed to provide high speed packet-based communication of up to 100 Mbps and aims at commercial deployment around 2010 timeframe. In order to accomplish the aim, a discussion is being held on several schemes: one scheme for reducing the number of nodes located in a communication path by simplifying a configuration of the network, and another scheme for maximally approximating wireless protocols to wireless channels.

Meanwhile, unlike voice service, the data service is provided on the resource determined according to the data amount to be transmitted and channel condition. Accordingly, the wireless communication system, especially cellular communication, is provided with a scheduler manages transmission resource allocation in consideration of the required resource amount, channel condition, data amount, etc. This is the fact in the LTE system as the next generation mobile communication system, and the scheduler located at the base station manages the transmission resource allocation.

Recent studies are focused on the LTE-Advanced (LTE-A) for improving data rate with the adaptation of several new techniques to legacy LTE system. For such a leap in technology, Inter-Cell Interference Coordination (ICIC) is also evolving to enhanced ICIC (eICIC). The eICIC/Time-domain ICIC is a technique to mitigate inter-cell interference to the victim cell by reducing transmit power in a cell causing interference or totally muting data transmission in unit of subframe. The UE located in the neighbor cell can have an opportunity for channel measurement to maintain the radio link to the neighbor cell and transmit data only in the corresponding subframe. This subframe is referred to as Almost Blank Subframe (ABS) and appears in a predetermined pattern. The ABSs are offered in various patterns depending on the aim of Radio Resource Management (RRM/RLM) measurement in serving cell, RRM measurement in neighbor cell, or Channel Status Information (CSI) measurement in serving cell, and the pattern size varies depending on FDD/TDD. Therefore, there is a need of a method for using the various patterns appropriately according to the situation.

DISCLOSURE OF INVENTION

Technical Problem

The present invention has been conceived to meet the above requirements and it is an object of the present invention to provide a method and apparatus for controlling inter-cell interference power amount efficiently using ABS pattern.

Solution to Problem

In order to solve the above problem, a measurement method of a terminal in a wireless communication system according to the present invention includes receiving RRC connection reconfiguration message including pattern information for serving cell or neighbor cell measurement; measuring the serving cell or neighbor cell in measurement target indicated in the RRC connection reconfiguration message based on the pattern information; and reporting measurement result to a base station.

The terminal for measuring a serving cell or neighbor cell in a wireless communication system according to the present invention includes a transceiver which transmits and receives signals to and from a base station and performs measurement for the serving cell or neighbor cell; and a control unit which controls receiving RRC connection reconfiguration message including pattern information for serving cell or neighbor cell measurement, measuring the serving cell or neighbor cell in measurement target indicated in the RRC connection reconfiguration message based on the pattern information, and reporting measurement result to a base station.

Advantageous Effects

The present invention is capable of controlling inter-cell interference power amount efficiently.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

There are various types of cells in the LTE system. For example, a Closed Subscriber Group (CSG) cell serves a constrained set of UEs. The CSG cell is mainly directed to providing indoor service and has small service coverage. A pico cell has small service coverage with a diameter of about 500 meter and mainly deployed at a hot spot area with frequent traffic of data. In the following, the cells having a short radius service area such as CSG cell and pico cell, as compared to the macro cell, may be referred to as micro base station.

These cells have relatively short radius service coverage as compared to the macro cell, and plural CSG cell and pico cells may be deployed in the service area of one macro cell. These cell interfere to each other, and this is described in detail hereinafter.

Figure 1:
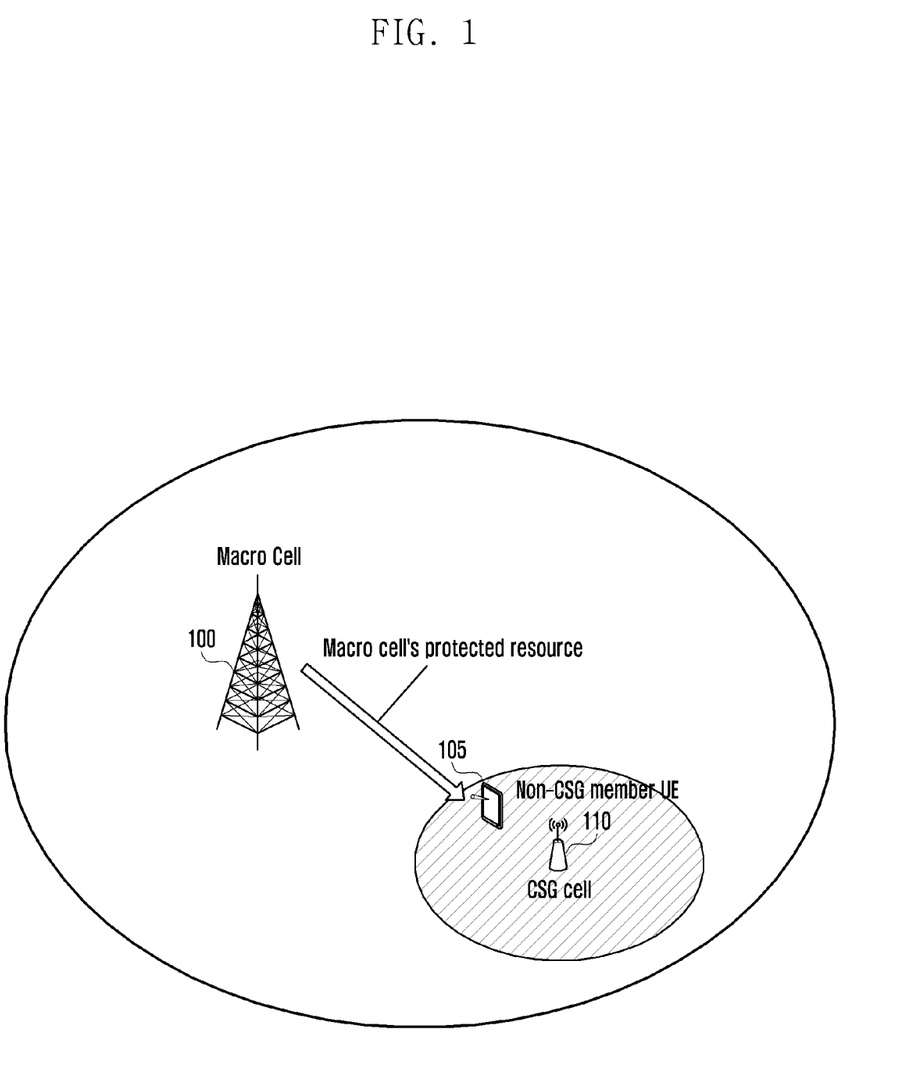
FIG. 1 is a diagram illustrating an interference scenario between a macro cell and a CSG cell.

FIG. 1 is a diagram illustrating an interference scenario between a macro cell and a CSG cell.

The UE 105 connects to the macro cell 100 to receive service. At this time it is assumed that the UE 105 moves to the service area of the CSG cell 110. If it is not a member of the CSG cell 110, the UE 105 is interfered significantly by the signal from the CSG cell. In this case, the CSG cell 110 becomes the aggressor cell, and the macro cell 100 becomes the victim cell.

Figure 2:
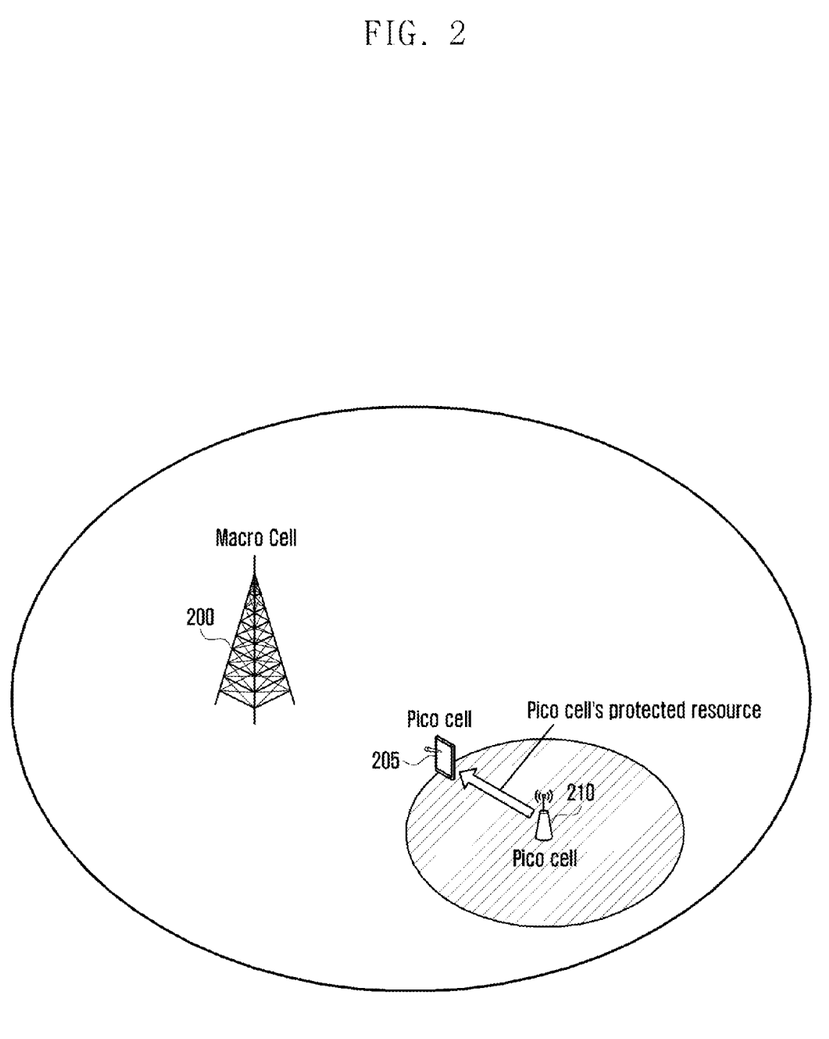
FIG. 2 is a diagram illustrating an interference scenario between a macro cell and a pico cell.

FIG. 2 is a diagram illustrating an interference scenario between a macro cell and a pico cell.

The UE connects to the pico cell to receive service. At this time, it is assumed that the UE 205 moves to the service area of the macro cell 200. In this case, the UE 205 is interfered significantly by the signal from the macro cell.

If the UE 205 performs handover to the macro cell 200, it is possible to cancel to interference from the macro cell. However, the pico cell 210 may be required to serve more users for the sake of operation efficiency and, in this case, it is necessary for the users at the cell boundary to be served by the pico cell 210. In this case, the macro cell 200 becomes the aggressor cell, and the pico cell 201 the victim cell.

The eICIC is a technique to mitigate interference form the aggressor cell to the victim cell in these inter-cell interference scenarios. In Rel-10, eICIC is restricted to be applied only in PCell.

In eICIC, The aggressor cell decreases transmission power or mutes data transmission according to a predetermined pattern in unit of subframe so as to mitigate the interference to the victim cell. In contrast, the UE in the victim cell performs channel measurement in the corresponding subframe to maintain the radio link with the victim cell and be scheduled for data transmission. Such a subframe is referred to as Almost Blank Subframe and appears in a predetermined pattern. Hereinafter, such a pattern may be referred to as ABS pattern and the terms are used interchangeably according to the situation.

Figure 3:
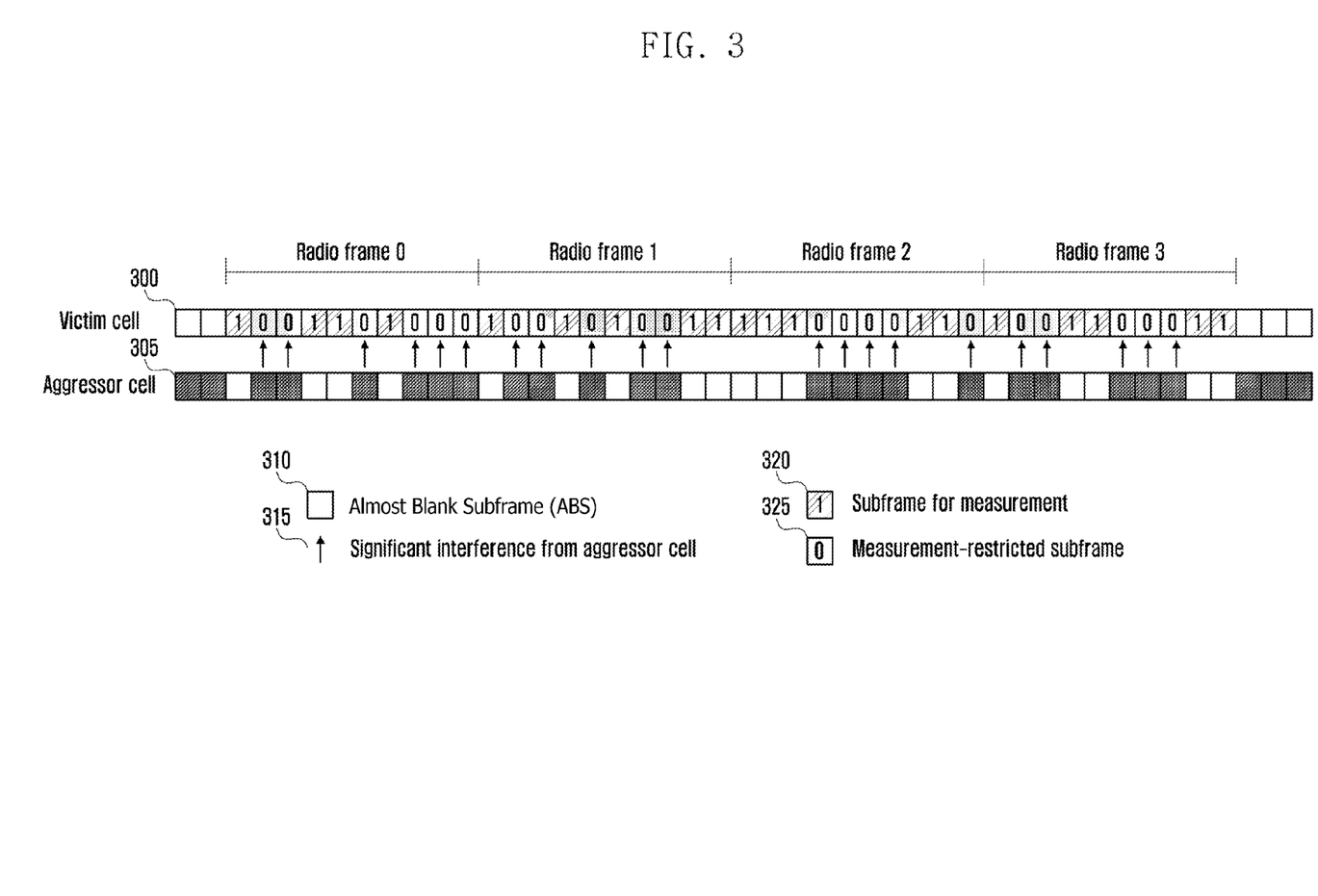
FIG. 3 is a diagram illustrating a pattern for use in the eICIC technique.

FIG. 3 is a diagram illustrating a pattern for use in the eICIC technique.

FIG. 3 shows the consecutive subframes structure 300 of the victim cell and the consecutive subframe structure 305 of the aggressor cell. In the aggressor cell, the subframe with reduced transmission power or muted is referred to as ABS and marked by 310 in the drawing. Other subframes carry the data based on the conventional power control. In the ABS subframe, there may be little or no interference to the subframe transmitted at the same time in the victim cell. In contrast, there may be significant interference to the victim cell in the other subframes 315 with the exception of the subframes.

The victim cell restricts RRM measurement or CSI measurement according to the position of the ABS subframe. The measurement restricted subframe 325 and the measurement non-restricted subframe 320 carry a pattern information indicated by 0 or 1 from the eNB to the UE through RRC signaling. The subframe indicated by 1 is ABS such that the corresponding subframe in the victim cell is not restricted in channel measurement or CSI measurement. There are various patterns as follows.

pattern 1: indicate ABS position for RRM/RLM measurement in serving cell pattern 2: indicate ABS position for RRM measurement in neighbor cell on frequency indicated by carrierFreq pattern 3: indicate subframe position in which CSI measurement is not restricted in serving cell. Unlike patterns 1 and 2, two patterns are provided.

In pattern 3, the two patterns are notified to the UE using respective csi-MeasSubframeSet1-r10 IE and csi-MeasSubframeSet2-r10 IE. The reason for using two patterns is to perform scheduling efficiently. It is not impossible absolutely to use the non-ABS subframe for data transmission in the victim cell. Accordingly, it is necessary to transmit data in the abs subframe and check channel status with the CSI report. If a relatively good CSI is received for the non-ABS subframe, the eNB may perform scheduling in the corresponding subframe. The UE stores the ABS configuration information on the two patterns and measures CSI information according to the pattern indicated by csi-MeasSubframeSet1-r10 and csi-MeasSubframeSet2-r10.

Figure 11:
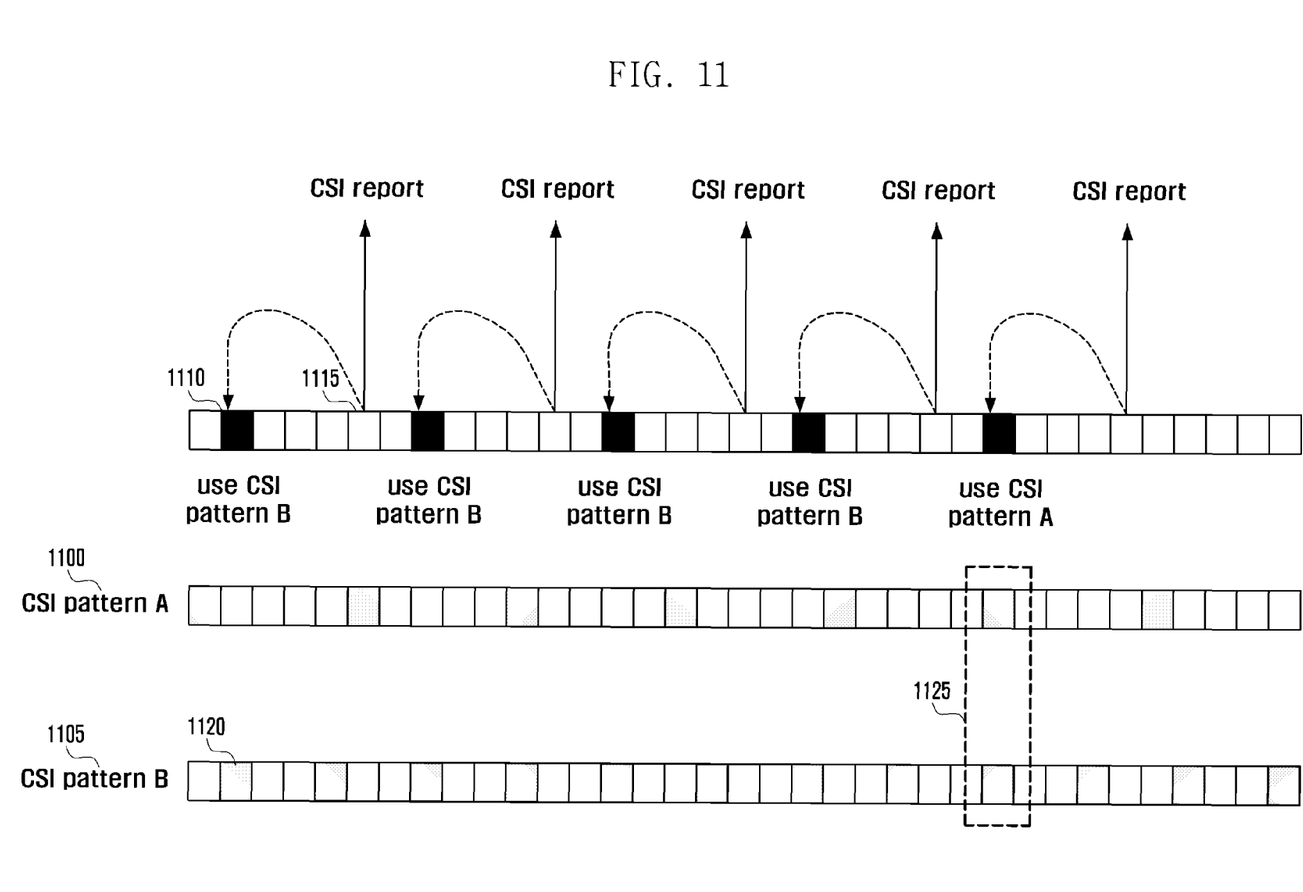
FIG. 11 shows a procedure of indicating the pattern to be applied to CSI report in a specific subframe using the scheduling information of the conventional Channel Status Information Reference Signal (CSI-RS).

FIG. 11 shows a procedure of indicating the pattern to be applied to CSI report in a specific subframe using the scheduling information of the conventional Channel Status Information Reference Signal (CSI-RS). There are two patterns 1100 and 1105 for CSI measurement. Each pattern indicates the subframes to be used for CSI measurement. If the CSI-RS report is performed at the subframe 1115, it is determined whether the subframe 1110 considering CSI-RS matches the subframe indicating a pattern. The first pattern 1100 does not indicate the subframe matching the subframe carrying the CSI-RS to be referenced. In contrast, the second pattern 1105 indicates one subframe 1120 matching the subframe carrying the CSI-RS. Accordingly, the CSI report in the subframe 115 is performed with the application of the second pattern. Problems occur when both the two patterns indicate the subframe referencing CSI-RS as denoted by reference number 1125 or no subframe. In order to solve this, one bit indication is used to indicate the pattern to be applied for CSI report carried in a specific subframe through explicit signaling. The first ABS pattern is indicated by 0, and the second ABS pattern is indicated by 1. As another method, implicit indication can be used. For example, if both the two patterns indicates the subframe referencing the CSI-RS, the CSI information to which the first or second ABS pattern has been applied unconditionally.

According to the proposal of the present invention, the pattern size varies according to Frequency Division Duplex/Time Division Duplex (FDD/TDD). The FDD uses 40-bit bitmap in which each bit corresponds to one subframe. Accordingly, 4 frames composed of total 40 subframes are expressed by one bitmap and this corresponds to 40 ms in time. In case of TDD, the bitmap size varies according to the TDD configuration. The bitmap size is 70 bits (corresponding to 70 ms) for TDD configuration 0, 20 bits (corresponding to 20 ms) for TDD configurations 1 to 5, and 60 bits (corresponding to 60 ms) for TDD configuration 6. The reason for using different-s size bitmaps is to provide the pattern information in consideration of HARQ period size. FIG. 3 is directed to the FDD case of using 40-bit bitmap corresponding to ABS information for 4 frames (40 ms), i.e. 40 subframes. This pattern information is applied repeatedly every 40 subframes.

Figure 4:
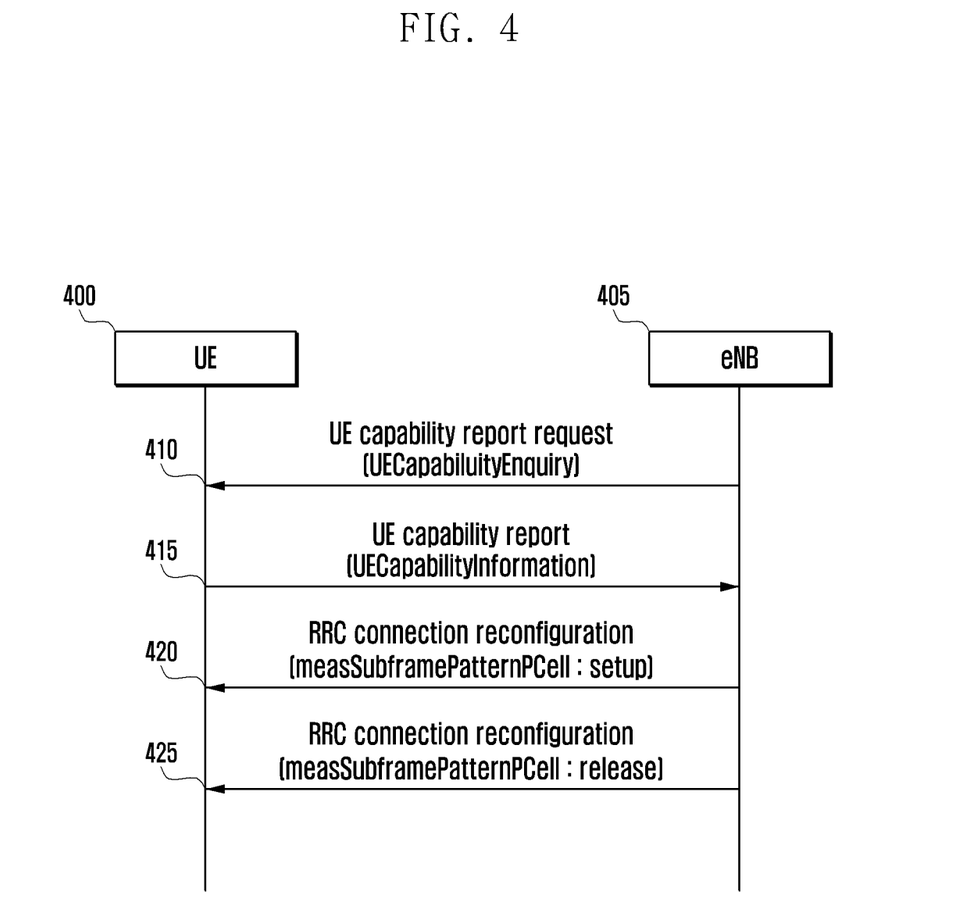
FIG. 4 is a message flow diagram illustrating RRC signaling with pattern 1.

FIG. 4 is a message flow diagram illustrating Radio Resource Control (RRC) signaling for indicating measurement with pattern 1 according to an embodiment of the present invention.

The eNB 405 sends the UE 400 a UE capability report request message (UECapabilityEnquiry) to request for UE capability at step 410. Then the UE 400 sends the eNB 405 a UE capability report message (UECapabilityInformation) to notify of eICIC capability at step 415.

Then the UE 400 receives ABS pattern information for RRM/RLM measurement in the serving cell from the eNB 405 through the RRC connection reconfiguration message at step 420. If the measSubframePatternPCell IE of the received RRC connection reconfiguration message includes the pattern information measSubframePattern along with measurement setup indicator, the UE 400 performs RRM/RLM measurement at SBSs in the serving cell.

That is, measSubframePatternPCell IE of the RRC connection reconfiguration message is configured, it can be interpreted as the indication of measurement in the serving cell using the pattern information included in the RRC connection reconfiguration message.

If the UE receives a release indication in the measSubframePatternPCell IE of the RRC connection reconfiguration message at step 425, the UE stops the ongoing eICIC.

Figure 5:
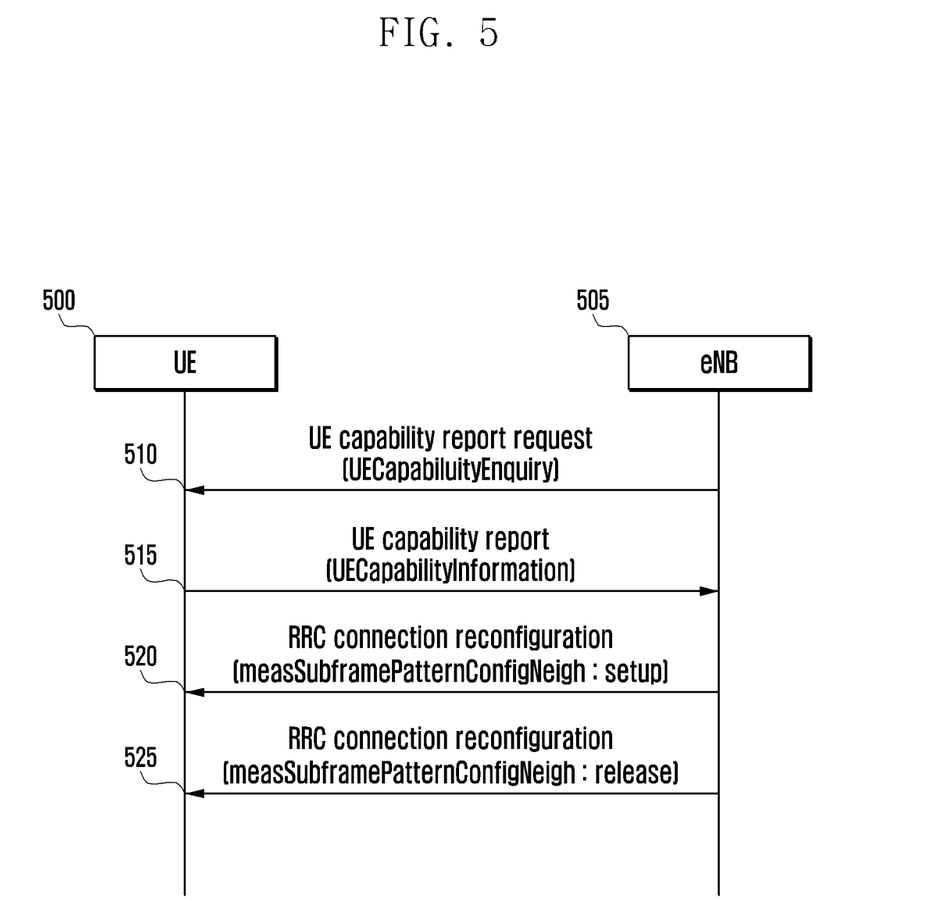
FIG. 5 is a message flow diagram illustrating RRC signaling with pattern 2.

FIG. 5 is a message flow diagram illustrating RRC signaling for indicating measurement with pattern 2 according to an embodiment of the present invention.

The eNB 505 sends the UE 500 a UE capability report request message (UECapabilityEnquiry) to request the UE 500 to report UE capability at step 510. Then the UE 500 sends the eNB 505 a UE capability message (UECapabilityInformation) to report the eICIC capability to the eNB 505 at step 515.

Then the UE 500 receives the RRC connection reconfiguration message including the ABS pattern information for RRM measurement in the neighbor cell from the eNB 505 at step 520. If the measSubframePatternConfigNeigh IE of the received RRC connection reconfiguration message includes the pattern information measSubframePattern along with the measurement setup indication, the UE 500 performs Radio Resource Management (RRM) measurement of the neighbor cell in ABSs.

That is, if the measSubframePatternConfigNeigh IE of the RRC connection reconfiguration message is configured, it can be interpreted as the indication of measurement in the neighbor cell using the pattern information included in the RRC connection reconfiguration message.

If the UE 500 receives a release indication in the measSubframePatternConfigNeigh IE of the RRC connection reconfiguration message at step 525, the UE stops the ongoing eICIC.

Figure 6:
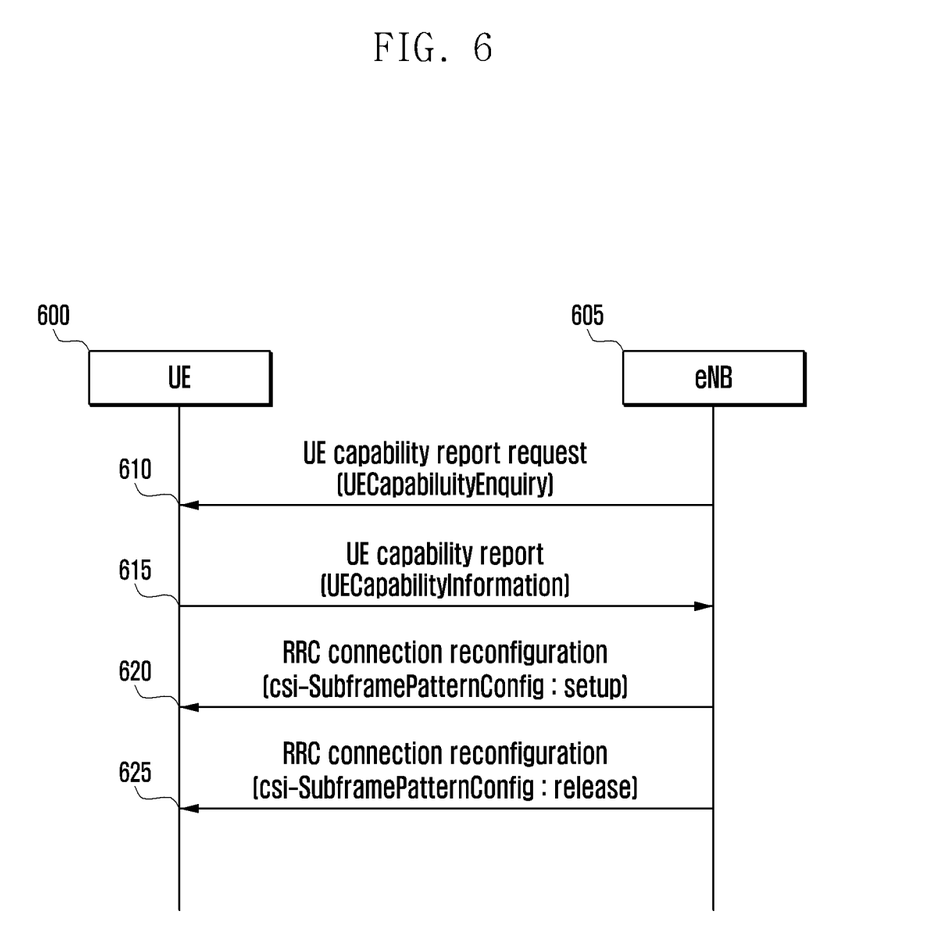
FIG. 6 is a message flow diagram illustrating RRC signaling with pattern 3.

FIG. 6 is a message flow diagram illustrating RRC signaling indicating measurement with pattern 3 according to an embodiment of the present invention.

The eNB 605 first sends the UE 600 a UE capability report request message (UECapabilityEnquiry) to request the UE 600 for UE quality at step 610. Then the UE 600 sends the eNB 605 a UE capability report message (UECapabilityInformation) to report the eICIC capability to the eNB 605 at step 615.

Then the UE 600 receives the RRC connection reconfiguration message including the ABS pattern information for CSI measurement in the serving cell from the eNB 605 at step 620. If the csi-SubframePatternConfig IE of the received RRC connection reconfiguration message includes the two pattern informations measSubframePattern along with the measurement setup indication, the UE 600 performs CSI measurement of the serving cell in ABSs.

If the UE 600 receives a release indication in the csi-SubframePatternConfig IE of the RRC connection reconfiguration message at step 625, the UE stops the ongoing eICIC.

Meanwhile, in order to use the pattern information provided to the UE through RRC signaling to restrict RRM/RLM or CSI measurement, it is necessary to define the mappings between the bits of the bitmap and the subframes. The first bit of the pattern information provided in the form of a bitmap is mapped to the first subframe of the frame with SFN (System Frame Number)=0. The following bits are mapped to the subsequent subframes one by one. The number of subframes in one SFN cycle is greater than the number of bits of the bitmap such that the bits of the bitmap are applied repeatedly at a pattern period. That is, the subframe at the start of the pattern is defined with the following formula.

[SFN*10+subframe number] mod [length of the bitmap (or length of the Pattern)]=0   [formula I]

Figure 7:
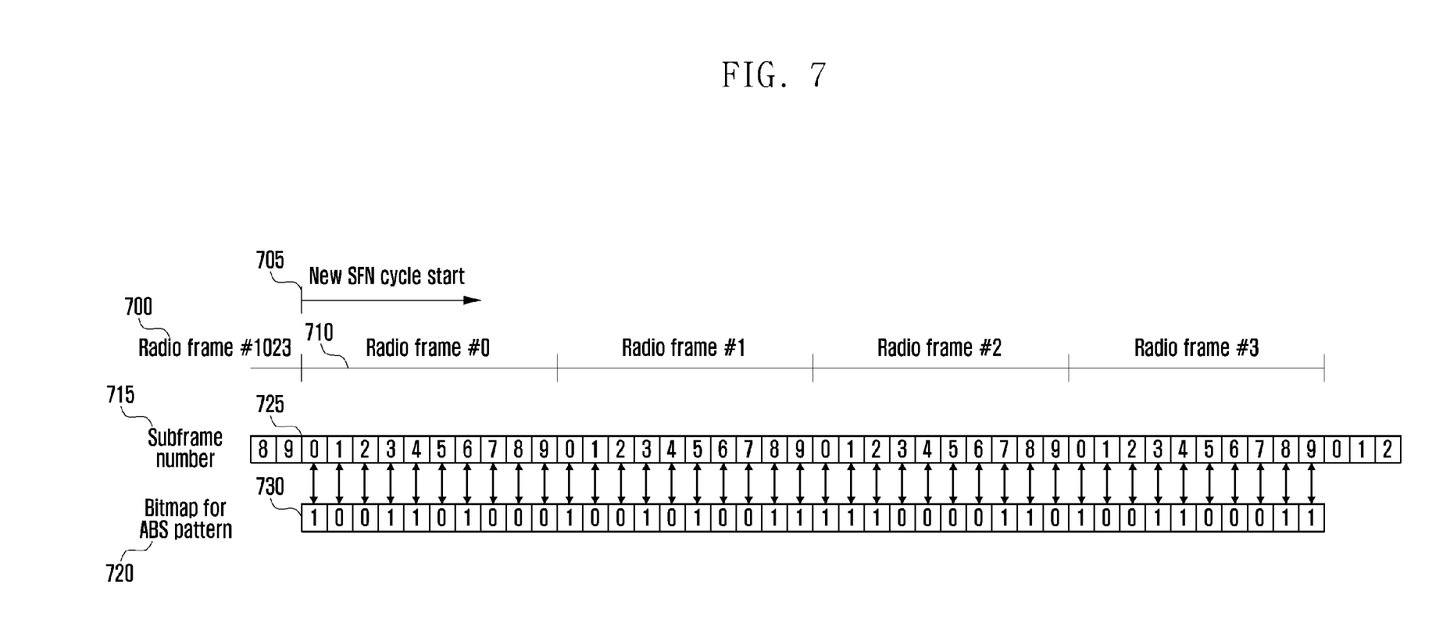
FIG. 7 is a diagram illustrating the relationship between bitmap informations and subframes.

FIG. 7 is a diagram illustrating the relationship between bitmap information and subframes. Each frame (or radio frame) is allocated an SFN value which increments by 1 as the frames increases. The SFN value is repeated cyclically. According to an embodiment of the present invention, the SFN value repeats in the range of 0 to 1023 cyclically at the period of 1024. If the frame 700 ends with the value of 1023, the next frame 710 is allocated a value of SFN=0 to start the new SFN cycle 705. The bitmap information 720 received for eICIC from the eNB is mapped to the subframes to indicate the subframes for used in RRM/RLM or CSI measurement.

The subframe number 715 is reset for every frame and has a range from 0 to 9. That is, one subframe includes 10 subframes. The first bit 730 of the bitmap 730 indicates whether perform eICIC at the first subframe of SFN=0. Then the following bits are mapped to the subsequent subframes one by one. As aforementioned, the number of subframes in one SFN cycle is greater than the number of bits of the bitmap, each bit of the bitmap repeats at the pattern period.

However, there is a need of further definition in the above mapping scheme. That is, in TDD configurations 0 and 6, the pattern informations having the period of 70 ms and 60 ms are used. Since the SFN cycle has the size of 1024, if the mapping is performed with the repetition of 70 ms or 60 ms, the pattern does not restart at the next SFN=0. Accordingly, if the SFN cycle size (period) is not an integer multiple of the pattern information length, it is necessary to further define which scheme is applied to perform eICIC.

Figure 8:
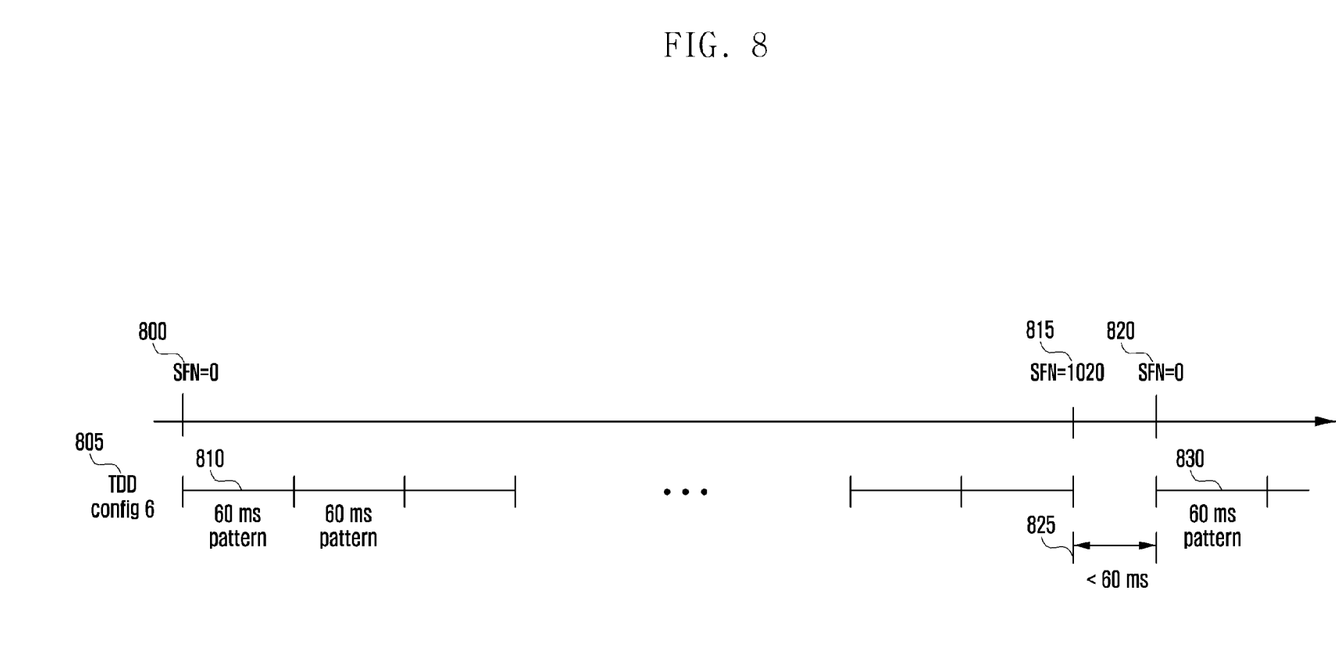
FIG. 8 is a diagram illustrating the additional operation definition in the present invention.

FIG. 8 is a diagram illustrating the additional operation definition in the present invention. The pattern of the TDD configuration 6 805 is provided at the position 800 as the first SFN=0, and the respective bits constituting this pattern 810 are mapped from the first subframe of the frame of SFN=0 to indicate whether to perform eICIC at each subframe. The pattern repeats until the frame 815 of SFN=1020.

However, the number of subframes from the frame 815 of SFN=1020 to the frame 820 of SFN=0 is not enough for mapping of one pattern. Accordingly, in the present invention, the pattern information is applied continuously even from the frame of SFN=1020 but, if the frame 802 of next SFN=0 arrives, stops mapping, although the corresponding pattern information is not mapped completely, and starts the pattern 830 newly again.

Figure 9:
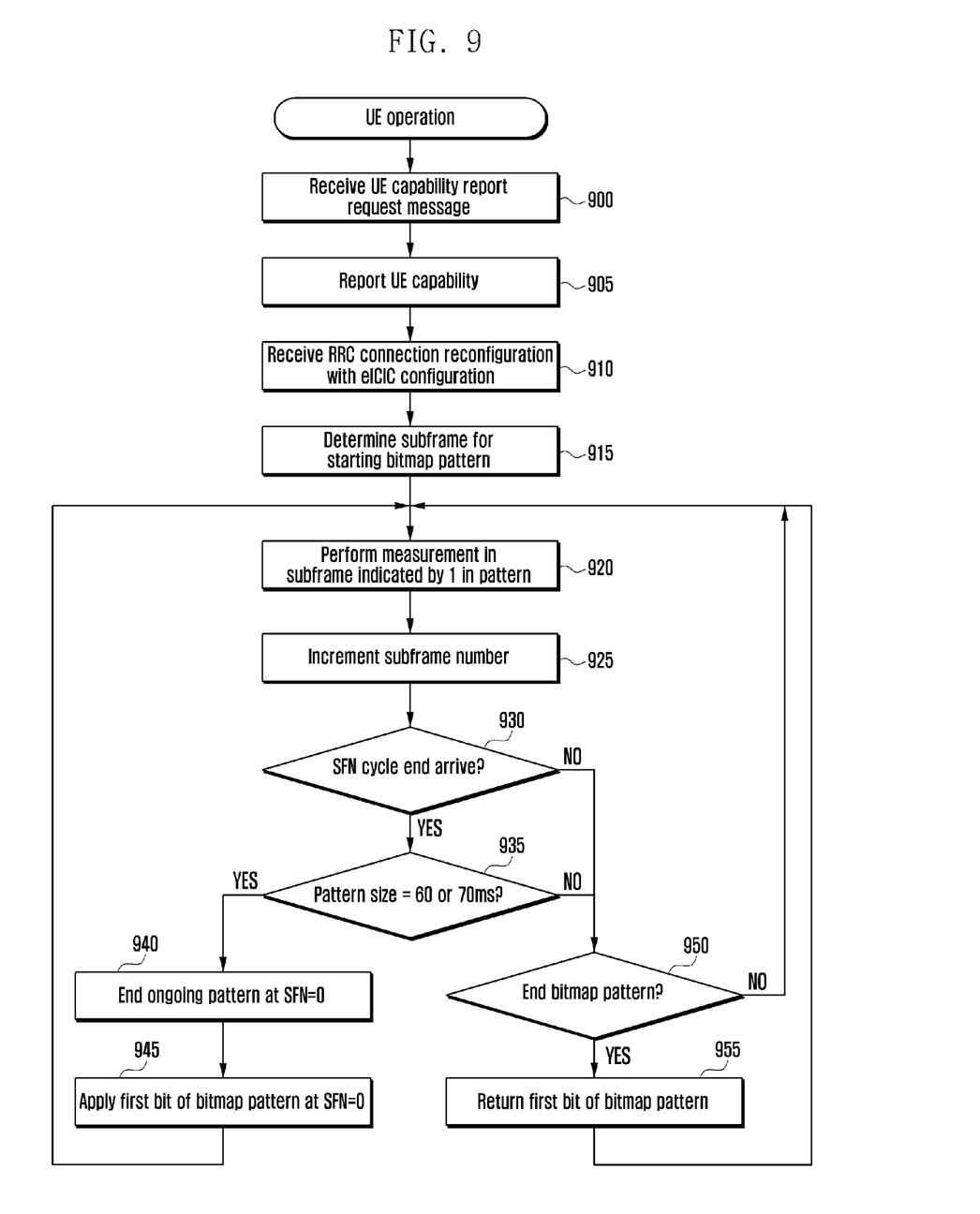
FIG. 9 is a flowchart illustrating the operation procedure of the UE performing eICIC.

FIG. 9 is a flowchart illustrating the operation procedure of the UE performing eICIC.

The UE first receives the UE capability report request message from the eNB at step 900. Then the UE reports its capability of supporting eICIC to the eNB at step 905.

The eNB instructs the UE to perform eICIC through RRC connection reconfiguration message at step 910 and provides the UE with the configuration such as ABS pattern information and measurement target (one of patterns 1 to 3) necessary for eICIC. The UE determines the subframe in which the pattern information starts at step 915 and the bit information of the bitmap which should be applied in the current subframe. According to an embodiment of the present invention, the first bit of the bitmap corresponds to the first subframe of the frame of SFN=0 and indicates whether to perform measurement.

The UE performs RRM/RLM or CSI measurement at the current subframe based on the bit information at step 920. The UE increments the subframe number at step 925. The UE determines whether the end time of the SFN cycle arrives at step 930. If the end time of the SFN cycle arrives, this may mean to determine where it is before a predetermined number of frames from the end time of the predetermined SFN repetition period. For example, if SFN has a period of 1024 and if the predetermined number is 40, this means that the determination is performed at the time where the SFN has the value of 1204−40=984.

If it has not end, the UE determines whether the pattern has ended at step 950. If the pattern has ended, the UE applies the first bit of the bitmap at step 955 and returns the procedure to step 920 to perform RRM/RLM or CSI measurement at the next subframe.

If it is determined that the SFN cycle is ending at step 930, the UE checks whether the pattern size is 60 ms or 70 ms at step 935. If the pattern size is 60 ms or 70 ms and if the SFN cycle ends to be reset to SFN=0, the UE stops ongoing pattern at step 940, applies the first bit of the bitmap at step 945, and returns the procedure to step 920 to perform the RRM/RLM or CSI measurement at the next subframe of SFN=0.

Figure 10:
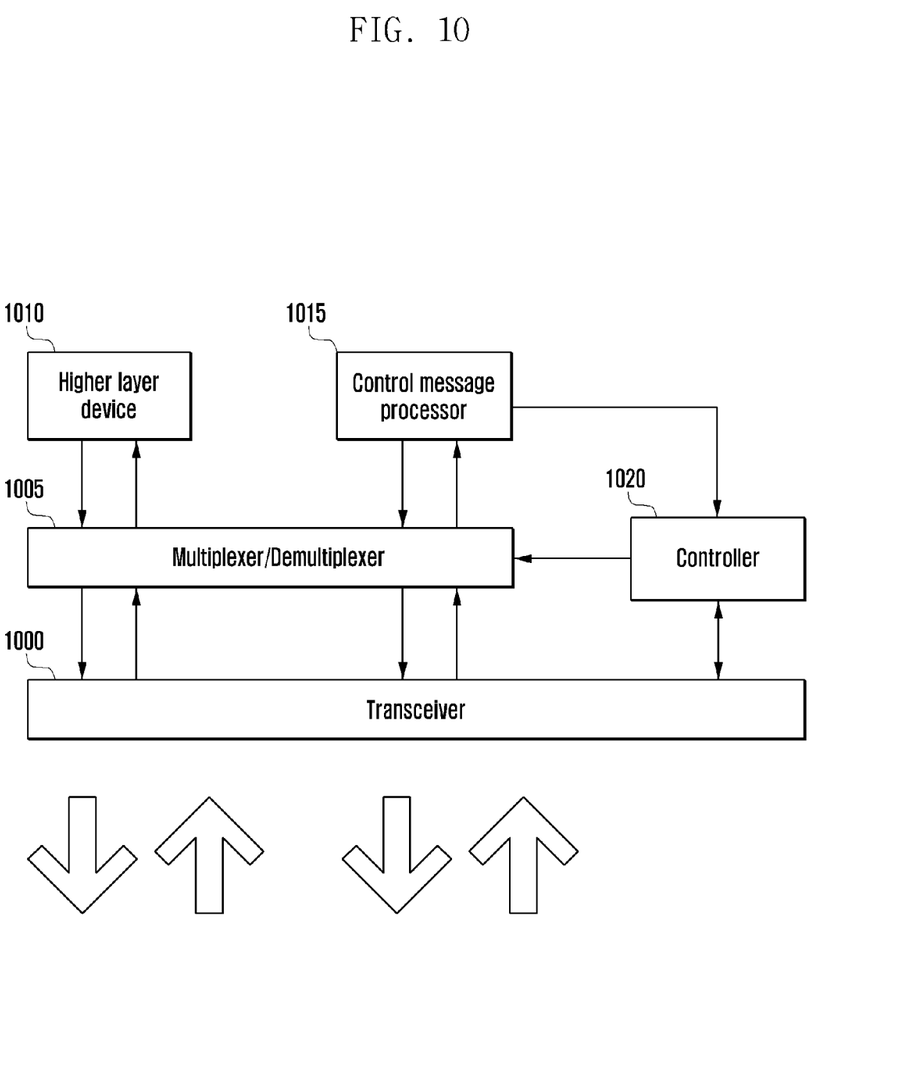
FIG. 10 is a block diagram illustrating the internal structure of the UE to which the present invention is applied.

FIG. 10 is a block diagram illustrating the internal structure of the UE to which the present invention is applied.

The UE communicates data with higher layer 1010 and transmits/receives control message through a control message processor 1015. When transmitting control signals or data to the eNB, the UE multiplexes the control signals or data by means of the multiplexer/demultiplexer 1205 and transmits the data through the transceiver 1000 under the control of the controller 1020. In contrast, if a signal is received by the transceiver 1000, the UE receives the physical signal by means of the transceiver 1000 under the control of the controller 1020. The received signal is demultiplexed by the multiplexer/demultiplexer 1005 and then transferred to the higher layer device 1010 or the control message processor 1015 according to the respective message informations.

According to an embodiment of the present invention, the controller 1020 receives the RRC connection reconfiguration message including the pattern information for serving cell or neighbor cell measurement from the eNB. The controller 1020 controls to perform the serving cell or neighbor cell measurement in the measurement target indicated by the RRC connection reconfiguration message based on the pattern information and report the measurement result to the eNB.

According to an embodiment of the present invention, the controller 1020 determines, when the end time of the system frame number repeating at a predetermined cyclic period is arriving, whether the cyclic period of the system frame number is an integer multiple of the pattern information size. If not any integer multiple, the controller 1020 ends the application of the current pattern information at the time when the system frame number value becomes 0 and corresponds the first bit of the pattern information to the first subframe having the frame of system frame number 0 to perform measurement.

What is claimed is:

1. A measurement method of a terminal in a wireless communication system, the method comprising:
receiving radio resource control (RRC) connection reconfiguration message including pattern information in a form of a bitmap having a certain size for serving cell or neighbor cell measurement;
mapping bits of the bitmap to subframes one-to-one; and
measuring the serving cell or neighbor cell in the subframes based on the mapping of the bits of the bitmap to the subframes one-to-one,
wherein the mapping comprises mapping a first bit of the bitmap to a first subframe of a frame having a system frame number (SFN) 0 when the SFN is reset to 0 after at least part of the bits of the bitmap are mapped to subframes having a last SFN one-to-one and a cycle of the SFN is not an integer multiple of the size of the bitmap.

2. The method of claim 1,
wherein the wireless communication system uses at least one of frequency division duplex or time division duplex in which the size of the bitmap is different, and
wherein the size of the bitmap is determined depending on time division duplex configuration, when the wireless communication system uses the time division duplex.

3. The method of claim 1, wherein the measuring of the serving cell or neighbor cell comprises:
determining, when the cycle of the SFN ends, whether the cycle of the SFN is not the integer multiple of the size of the bitmap;
terminating, when the cycle of the SFN is not the integer multiple of the size of the bitmap, application of current pattern information to the subframes at a time when the SFN becomes 0; and
performing the measurement based on the mapping of the first bit of the bitmap to the first subframe of the frame having the SFN 0.

4. The method of claim 1, further comprising:
reporting measurement result to a base station.

5. The method of claim 1, wherein subsequent bits of the first bit of the bitmap are mapped to subsequent subframes of the first subframe of the frame one by one.

6. The method of claim 5, wherein the bitmap is mapped to the subframes repeatedly.

7. The method of claim 1, further comprising before receiving the RRC connection reconfiguration message:
receiving a capability report request message from a base station; and
transmitting a capability report message to notify of capability of inter-cell interference coordination.

8. A terminal for measuring a serving cell or neighbor cell in a wireless communication system, the terminal comprising:
a transceiver which transmits and receives signals to and from a base station and performs measurement for the serving cell or neighbor cell; and
at least one processor configured to:
control the transceiver to receive a radio resource control (RRC) connection reconfiguration message including pattern information in a form of bitmap having a certain size for serving cell or neighbor cell measurement,
map bits of the bitmap to subframes one-to-one, and
measure the serving cell or neighbor cell in the subframes based on the mapping of the bits of the bitmap to the subframes one-to-one,
wherein the at least one processor is further configured to map a first bit of the bitmap to a first subframe of a frame having a system frame number (SFN) 0 when the SFN is reset to 0 after at least part of the bits of the bitmap are mapped to subframes having a last SFN one-to-one and a cycle of the SFN is not an integer multiple of the size of the bitmap.

9. The terminal of claim 8,
wherein the wireless communication system uses at least one of frequency division duplex or time division duplex in which the size of the bitmap is different, and
wherein the size of the bitmap is determined depending on time division duplex configuration, when the wireless communication system uses the time division duplex.

10. The terminal of claim 8, wherein the at least one processor is further configured to:
determine, when the cycle of the SFN ends, whether the cycle of the SFN is not the integer multiple of the size of the bitmap,
terminate, when the cycle of the SFN is not the integer multiple of the size of the bitmap, application of current pattern information to the subframes at a time when the SFN becomes 0, and
perform the measurement based on the mapping of the first bit of the bitmap to the first subframe of the frame having the SFN 0.

11. The terminal of claim 8, wherein the at least one processor is configured to control the transceiver to report measurement result to the base station.

12. The terminal of claim 8, wherein subsequent bits of the first bit of the bitmap are mapped to subsequent subframes of the first subframe of the frame one by one.

13. The terminal of claim 12, wherein the bitmap is mapped to the subframes repeatedly.

14. The terminal of claim 8, wherein the at least one processor is configured to:
control the transceiver, before receiving the RRC connection reconfiguration message,
receive a capability report request message from the base station, and
transmit a capability report message to notify of capability of inter-cell interference coordination.

* * * * *